United States Patent [19]

Pogue

[11] Patent Number: 4,777,584
[45] Date of Patent: Oct. 11, 1988

[54] OPERATOR INTERFACE FOR A PROCESS CONTROLLER

[76] Inventor: James L. Pogue, 1038 Park Ave., Winthrop Harbor, Ill. 60096

[21] Appl. No.: 93,111

[22] Filed: Sep. 3, 1987

Related U.S. Application Data

[63] Continuation of Ser. No. 720,977, Apr. 8, 1985, abandoned.

[51] Int. Cl.$^4$ .......................................... H03K 17/00
[52] U.S. Cl. .................................................. 364/146
[58] Field of Search ............... 364/136, 141, 146, 147, 364/188

[56] References Cited

U.S. PATENT DOCUMENTS

| | | | |
|---|---|---|---|
| 4,124,888 | 11/1978 | Washburn | 364/200 |
| 4,228,495 | 10/1980 | Bernhard et al. | 364/200 X |
| 4,244,034 | 1/1981 | Cherba | 364/900 |
| 4,300,207 | 11/1981 | Eivers et al. | 364/900 |
| 4,303,990 | 12/1981 | Seipp | 364/900 |
| 4,520,234 | 5/1985 | Fields et al. | 379/29 |
| 4,562,550 | 12/1985 | Beatty et al. | 364/492 |
| 4,570,217 | 2/1986 | Allen et al. | 364/188 |
| 4,616,307 | 10/1986 | Kusumi et al. | 364/147 |
| 4,648,064 | 3/1987 | Morley | 364/900 |

FOREIGN PATENT DOCUMENTS

| | | | |
|---|---|---|---|
| 0076328 | 4/1983 | European Pat. Off. | 364/191 |
| 0069710 | 4/1985 | Japan | 364/188 |
| 2163926 | 3/1986 | United Kingdom | 364/188 |

OTHER PUBLICATIONS

"Gould Modicon 584 L Programmable Controller Product Description", Gould Inc., Doc. No. 5M-1183NP, 1983, 1-1 to 8-3.

"Gould Modicon Modvue Programmable Touch Control Center Product Description", Gould Inc., Doc. No. 5M-1083NP, 1983, 1-14.

Primary Examiner—Jerry Smith
Assistant Examiner—Clark A. Jablon
Attorney, Agent, or Firm—Wood, Dalton, Phillips, Mason & Rowe

[57] ABSTRACT

An operator interface for a programmable controller is disclosed. The programmable controller has a plurality of discrete input terminals, a discrete input switch coupled to one of the input terminals, a plurality of discrete output terminals, a processor and a memory. The memory stores operating system software processed by the processor and comprises relay logic. The processor controls states of the output terminals in response to states of the input terminals and the relay logic. The operator interface selectively operatively coupled the input switch to a desired one of the output terminals and comprises an operator actuable control switch coupled to another one of the input terminals and an element responsive to actuation of the control switch for selectively coupling the input switch to the selected one of the output terminals, the coupling element comprising the operating system software processed by the processor.

4 Claims, 6 Drawing Sheets

OPERATOR INTERFACE FOR A PROCESS CONTROLLER

This application is a continuation of application Ser. No. 720,977, filed Apr. 8, 1985, now abandoned.

TECHNICAL FIELD

The present invention relates to industrial programmable controllers and more particularly to a control wherein the quantity of operator input devices are minimized and output messages are displayed in accordance with a predetermined priority scheme.

BACKGROUND ART

Programmable controllers are commonly used in modern factories to control various industrial processes.

The programmable controller, or PC, functions as a replacement for electromechanical relays and coils and minicomputers.

The programmable controller reads the present value of an input, makes a logic decision based on the input value in accordance with a stored program and generates an output signal to drive an output device to either an "On" or "Off" state.

Input values include feedback signals representing parameters of the controlled process, output signals generated by other PCs or operator actuated devices such as pushbutton switches, or pushbuttons, which allow the operator to enter information or commands into the PC.

For each operator command entered into the PC, a specific pushbutton is required, along with the resulting cabinet space and hard-wired connections. In a large industrial process this requires very large cabinets containing many hard-wired connections. Industrial grade switches and the labor required to install same can become quite expensive and as is commonly realized in the industry, each additional device or connection thereto corresponds to an additional source of component and, hence, system failure.

As the quantity of operator pushbuttons increase, the operator is progressively given a more error prone task of selecting the correct pushbutton with which to respond.

In addition, as the industrial process is later modified and additional operator activated devices are required, additional pushbuttons must be installed.

In the event of an alarm condition requiring an operator response, the output signals may actuate a general alarm indicator such as a lamp, or they may actuate one of a plurality of indicator lamps corresponding to the specific problem or the specific operator response required.

Such alarm indications do not inform the operator of the sequence in which the alarms occurred, of the priority of the alarms nor of the proper response thereto.

In addition, the operator upon observing the alarm condition, must first determine and then locate the correct input pushbutton with which to respond.

SUMMARY OF THE INVENTION

In accordance with the present invention, an industrial control includes means for selectively connecting a pushbutton group comprising a plurality of external operator activated pushbuttons to one of a plurality of internal groups of software coils contained in the PC.

Means are provided for displaying on a video display terminal, or VDT, messages indicating the present function of each pushbutton, as determined by the coil which each of the plurality of operator pushbuttons currently activates.

Means are provided for prioritizing alarm messages as they are generated and for displaying the prioritized alarm messages on the VDT.

Upon detection of an alarm condition, the pushbutton group is connected to the correct group of coils such that the operator may effect a timely response thereto.

The invention disclosed herein pertains to a Modicon 584L Programmable Controller, manufactured by Gould Inc., Programmable Control Division, P.O. Box 3083, Andover, Mass., 01810.

The broad inventive concept comprehended by the invention is applicable to other programmable controllers, and is in no way intended to be limited solely to the Modicon 584L Programmable Controller.

BRIEF DESCRIPTION OF THE DRAWINGS

Other features and advantages of the invention will be apparent from the following description taken in connection with the drawings, wherein:

FIG. 3 illustrates the correct arrangement of FIGS. 4A, B, C and D; and

FIGS. 4 A, B, C and D taken collectively illustrate a flow sequence for prioritizing messages and subsequently displaying the prioritized messages on a VDT and printer.

BEST MODE FOR CARRYING OUT THE INVENTION

Figure 1:
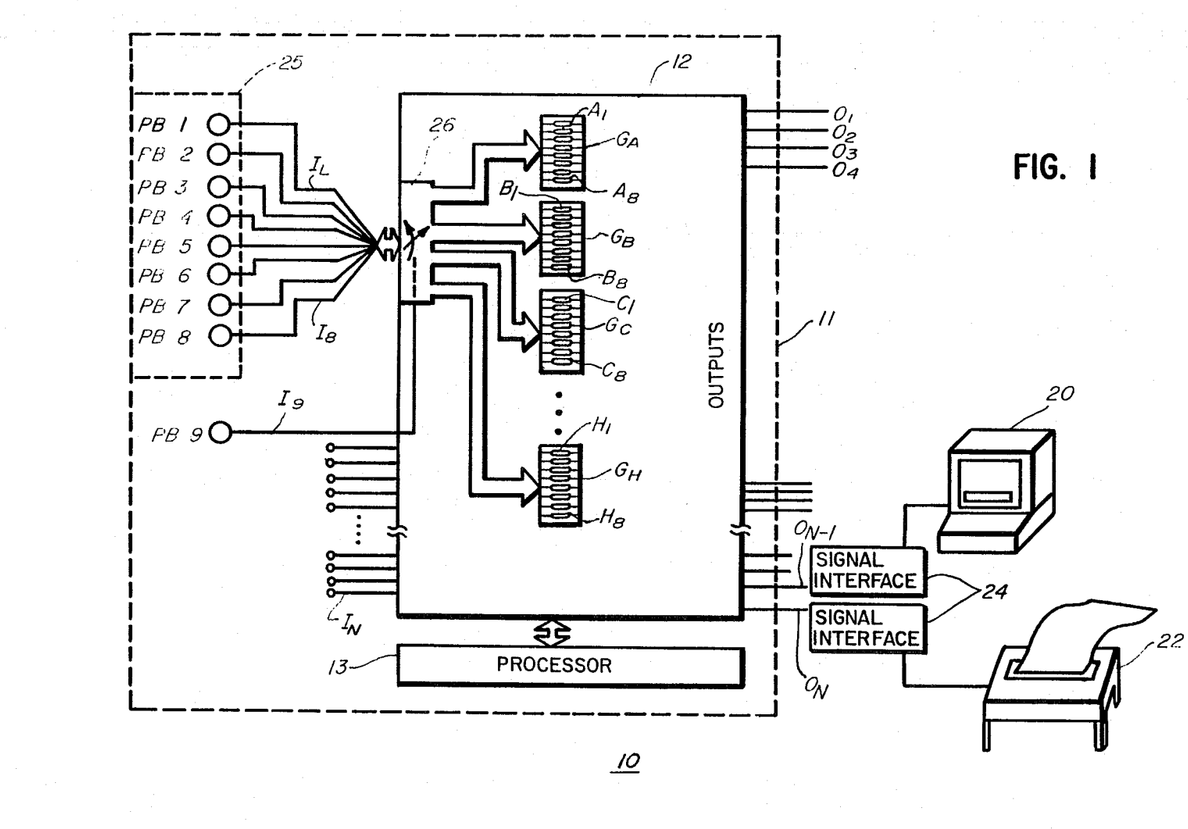
FIG. 1 is a block diagram illustrating the present invention.

Referring now to FIG. 1, there is illustrated an industrial control 10, including a programmable controller 11. Programmable controller 11, for example can be a Modicon 584L manufactured by Gould Inc., Programmable Control Division of Andover, Mass.

Programmable controller 11 includes a plurality of inputs $I_1$-$I_N$, a plurality of outputs $O_1$-$O_N$, a memory section 12 a processor section 13.

Inputs $I_1$-$I_N$ can be coupled to various devices such as sensors for monitoring equipment parameters and conditions (not shown), other computers or programmable controllers in the system (not shown) or manually operated devices such as pushbutton switches or pushbuttons $PB_1$-$PB_9$.

Outputs $O_1$-$O_N$ may be coupled to various devices to be controlled such as a motor starter (not shown), another computer or programmable controller (not shown), a video display terminal, or VDT, 20 or a printer 22.

Programmable controller 11 stores in memory section 12 a program including relay logic comprising coils and contacts and operating data information received by inputs $I_1$-$I_N$ and responds to the operating data in accordance with the program by generating signals at outputs $O_1$-$O_N$.

A signal interface 24, for example a Modicon P453 manufactured also by Gould Inc., Programmable Controls Division, Andover, Mass., and shown connected between a first output $O_{N-1}$ and VDT 20 or a second output $O_N$ and printer 22 may be required to convert a signal generated at one of the outputs $O_1$-$O_N$ to a form recognizable by the device connected thereto.

Eight coil groups $G_A$-$G_H$, each comprising eight coils, $A_1$-$A_8$, $B_1$-$B_8$, etc. respectively, are selectively coupled to a pushbutton group 25 by a software implemented switch 26, the operation of which is further discussed below.

For example when switch 26 couples pushbutton group 25 to coil group $G_A$, pushbutton PB1 becomes coupled to and thereby capable of actuating coil $A_1$. Pushbuttons PB2-PB8 become coupled to coils $A_2$-$A_8$, respectively. Similarly, when switch 26 couples pushbutton group 25 to coil group $G_B$, pushbuttons PB1-PB8 become coupled to coils $B_1$-$B_8$ respectively. In like fashion, switch 26 can also couple pushbutton group 25 to remaining coil groups $G_C$-$G_H$.

Thus, each pushbutton, PB1-PB8 can perform a plurality of functions, wherein the specific function is determined by switch 26.

As described in detail below, a message is displayed by VDT 20 indicating the current function of each of the pushbuttons PB1-PB8, corresponding to the coil to which the particular pushbutton PB1-PB8 is presently coupled.

As discussed further below, in the event that messages to be displayed by VDT 20 cannot be displayed as rapidly as generated by programmable controller 12, the messages are stacked in the memory thereof and prioritized in accordance with the relative importance of the message.

Figure 2:
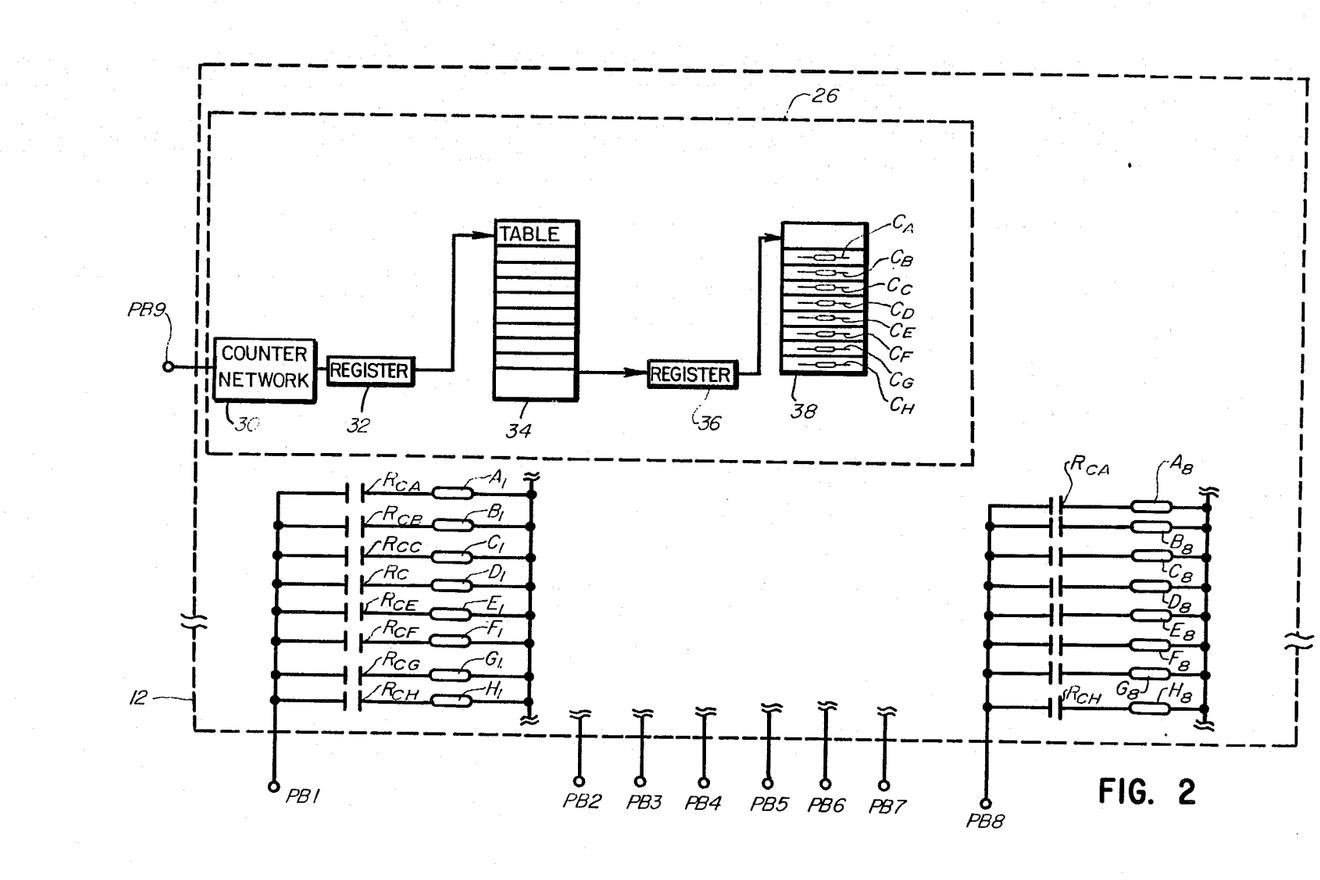
FIG. 2 is a block diagram of a control for connecting a group of pushbutton switches to one of a plurality of groups of inputs to a programmable controller.

Referring to FIG. 2, illustrated is switch 26, a software implemented function within programmable controller 12.

Counter network 30, a cyclical counter which counts from 1 to 8 returning then to 1, increments in response to a command from a control pushbutton PB9.

A first register 32, capable of electronically storing 16 bits of digital data, and coupled to the output of counter network 30, stores the current value of counter network 30.

A first table 34 comprises eight 16-bit registers wherein each register stores a unique number. First table 34 is coupled to the output of first register 32 and to the input of a second register 36.

The number stored in first register 32 corresponds to one of the eight registers of first table 34, causing the number contained within the corresponding register of first table 34 to be placed into second register 36.

Therefore, as control pushbutton PB9 is operated, counter network 30 is incremented and a number 1 through 8 is placed into first register 32. The number in first register 32 enables one of the registers of first table 34 to place the number contained therein into second register 36. Thus, operation of control pushbutton PB9 controls the placement of a unique number from one of the registers of first table 34 into second register 36.

Second register 36 is coupled to a second table 38 containing eight coils $C_A$-$C_H$. The number contained in second register 36 corresponds to and thereby actuates one of the eight coils $C_A$-$C_H$. The particular coil $C_A$-$C_H$ actuated selectively connects pushbutton group 25 (FIG. 1) to one of coil groups $G_A$-$G_H$. Specifically, as listed below, for each coil $C_A$-$C_H$, there corresponds eight normally-open software relays.

| Coil: | Corresponding Relays |
| --- | --- |
| $C_A$ | $R_{CA}$ |
| $C_B$ | $R_{CB}$ |
| $C_C$ | $R_{CC}$ |
| $C_D$ | $R_{CD}$ |
| $C_E$ | $R_{CE}$ |
| $C_F$ | $R_{CF}$ |
| $C_G$ | $R_{CG}$ |
| $C_H$ | $R_{CH}$ |

For example, upon actuation of coil $C_A$ of second table 38, corresponding relays $R_{CA}$ change from a normally-open state to a closed state.

Therefore, actuation of coil $C_A$ and the corresponding closing of normally-open relays causes pushbutton PB1 to become coupled and thereby capable of actuating coil $A_1$. Pushbuttons PB2-PB8 become coupled and thereby capable of actuating coils $A_2$-$A_8$, respectively. Similarly, actuation of coil $C_B$ of second table 38 closes normally-open relays $R_{CB}$, thereby coupling pushbuttons PB1-PB8 to coils $B_1$-$B_8$, respectively.

It can be seen, that the actuation of a coil of second table 38 determines to which coil group, $G_A$-$G_H$, pushbuttons PB2-PB8 are currently connected. Therefore, when switch 26 has coupled pushbutton group 25 to coil group $G_A$, pushbutton PB1 is coupled to coil $A_1$, thereby controlling the state of coil $A_1$. Similarly, pushbuttons PB2-PB8 are coupled to coils $A_2$-$A_8$ respectively, thereby respectively controlling the states of coils $A_2$-$A_8$.

When switch 26 has coupled pushbutton group 25 to coil group $G_B$, pushbutton PB1 is coupled to coil $B_1$, and is then capable of controlling the state of coil $B_1$.

Similarly, pushbuttons PB2-PB8 are coupled to coils $B_2$-$B_8$, respectively, and thereby control the states of coils $B_2$-$B_8$.

In a like manner, control pushbutton PB9 can selectively cause pushbutton group 25 to be coupled to coil groups $G_C$-$G_H$, coupling pushbuttons PB1-PB8 to coils, $C_1$-$C_8$, $D_1$-$D_8$, $E_1$-$E_8$, $F_1$-$F_8$, $G_1$-$G_8$ or $H_1$-$H_8$, respectively, thereby controlling the state thereof.

Additionally actuation of any of coils $C_A$-$C_8$ selectively actuates the generation of a message, to be displayed on VDT 20 indicating the current function of each of the pushbuttons PB1-PB8.

Figures 3, 4D:
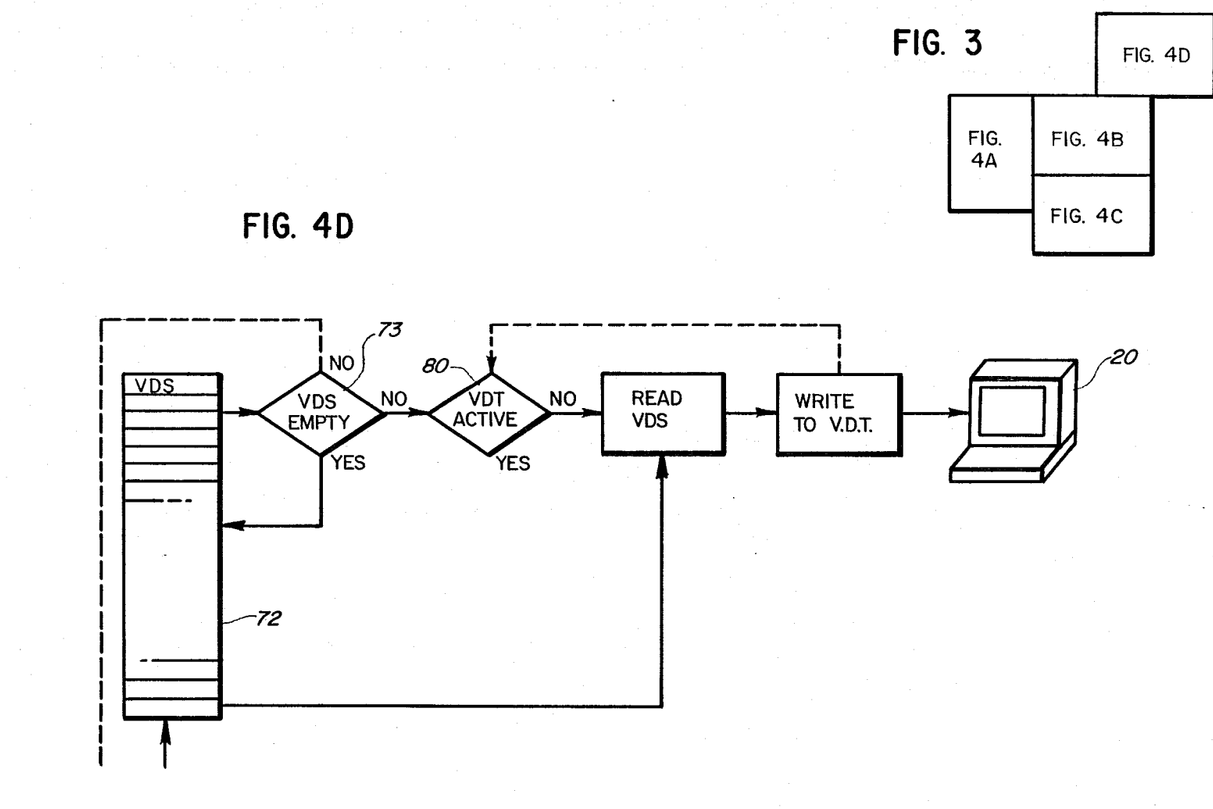

Referring to FIG. 3, illustrated is the proper arrangement for FIGS. 4 A, B, C and D.

Figure 4A:
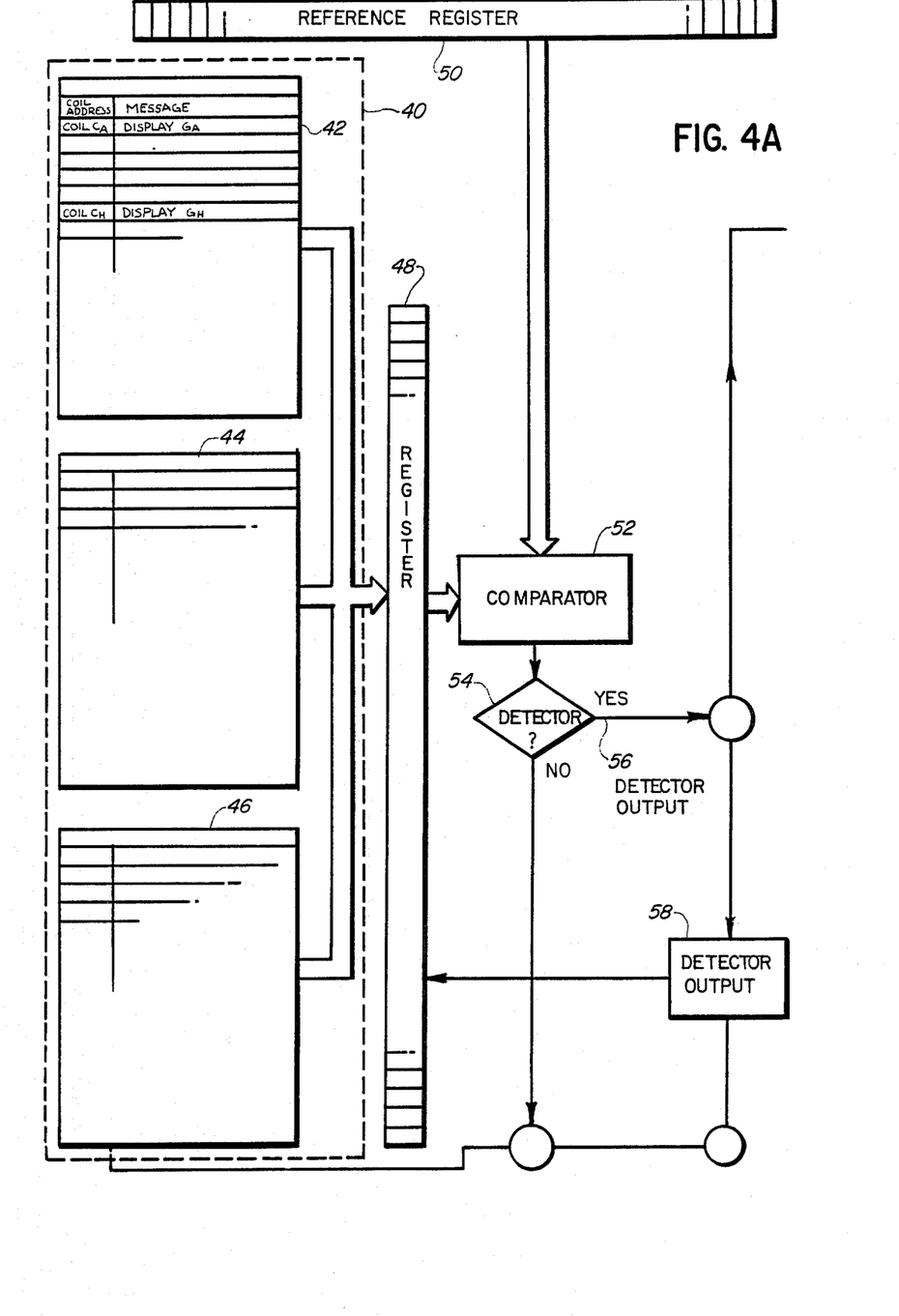

Referring to FIG. 4A, illustrated is a ninth coil group 40. Ninth coil group 40 contains a first subgroup 42 comprising coils corresponding to priority messages to be displayed by VDT 20, a second subgroup 44 corresponding to non-priority messages to be displayed by VDT 20 and a third subgroup 46 corresponding to messages to be printed by printer 22.

Actuation of a coil, herein referred to as a coil address, activates a corresponding coil of ninth coil group 40 to initiate the generation of a specific message.

A third register 48 comprises forty-eight binary locations, wherein the state of each binary location corresponds sequentially to the state of a particular coil of ninth coil group 40. Specifically, the first sixteen binary locations sequentially correspond to the sixteen coils included in first subgroup 42. The second sixteen binary locations sequentially correspond to the sixteen coils included in second subgroup 44 and the third sixteen binary locations sequentially correspond to the sixteen coils included in third subgroup 46.

A display command actuates a particular coil included in ninth coil group 40 thereby causing the value of the corresponding location in third register 48 to change state from zero to one.

A reference register 50 comprises forty-eight binary locations, the state of which are each zero.

A comparator 52, coupled to both third register 48 and reference register 50 compares bit to bit each binary location of third register 48 with each binary location of reference register 50, thereby detecting which, if any, of the binary locations of third register 48 are equal to one.

A message number is generated by comparator 52 indicating which of the binary locations of third register 48 are equal to one, thereby indicating which coils of ninth coil group 40 have been actuated.

A detector 54, coupled to the output of comparator 52 detects whether a message number has been generated by comparator 52.

When a message number so generated has been detected, detector 54 releases the message number at a first detector output 56.

The message number generated at first detector output 56, indicating a command for the display of a particular message, performs two functions.

First an output signal on a second detector output 58 resets the corresponding value of the binary location of third register 48 back to zero.

Figure 4B:
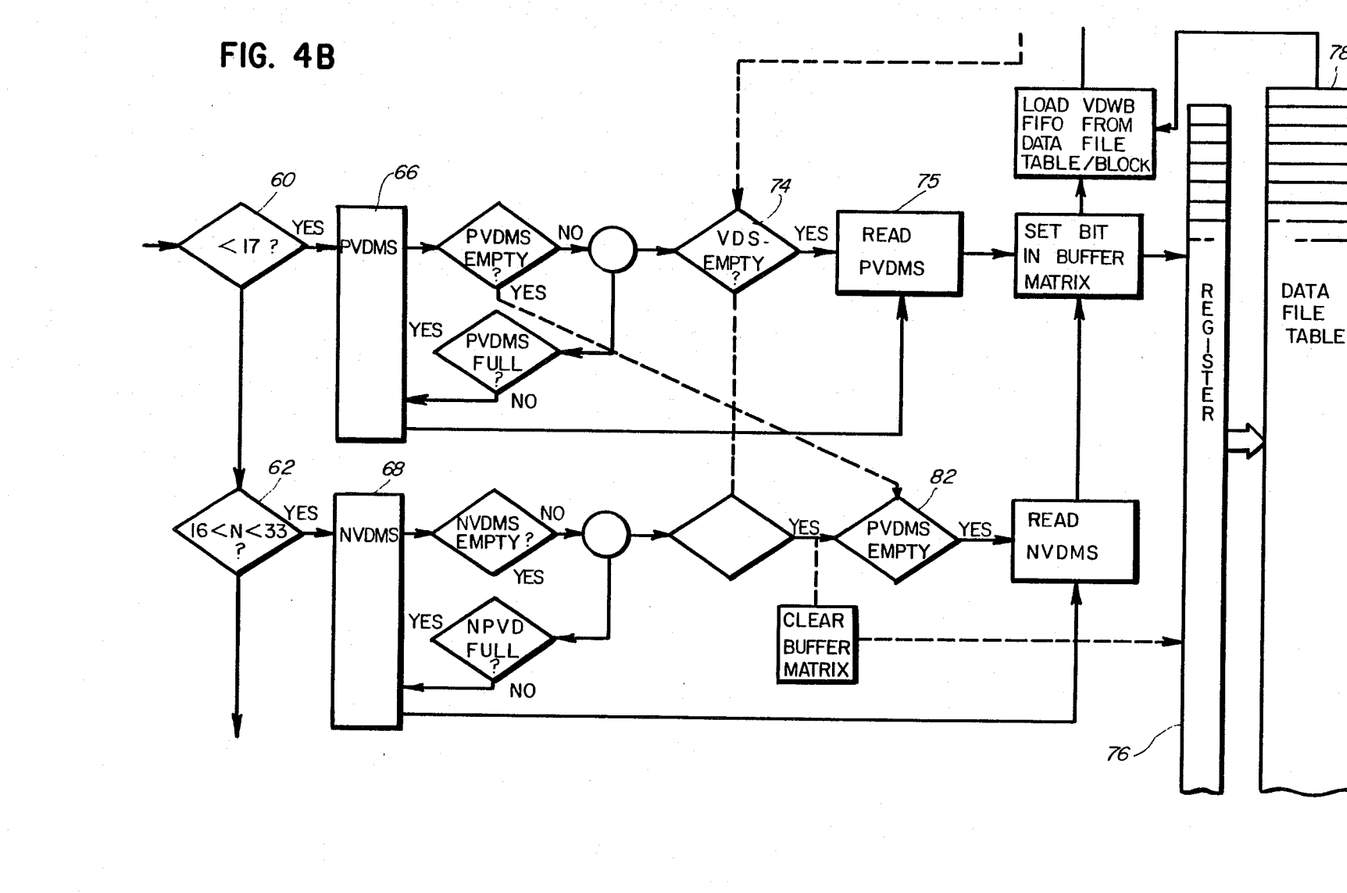

Second, as illustrated on FIG. 4B, second, third and fourth comparators, 60, 62, and 64, each view the message number generated at first detector output 56.

If the message number is less than seventeen, indicating that the message was initiated by a coil within first subgroup 42 and therefore a priority message to be displayed by VDT 20, second comparator 60 places the message number in a priority video display memory stack, or PVDMS, 66.

Similarly, if the message number is greater than sixteen but less than thirty-three, indicating that the message was initiated by a coil within second subgroup 44 and, therefore a non-priority message to be displayed by VDT 20, third comparator 62 places the message number on a non-priority video display message stack, or NVDMS, 68.

Figure 4C:
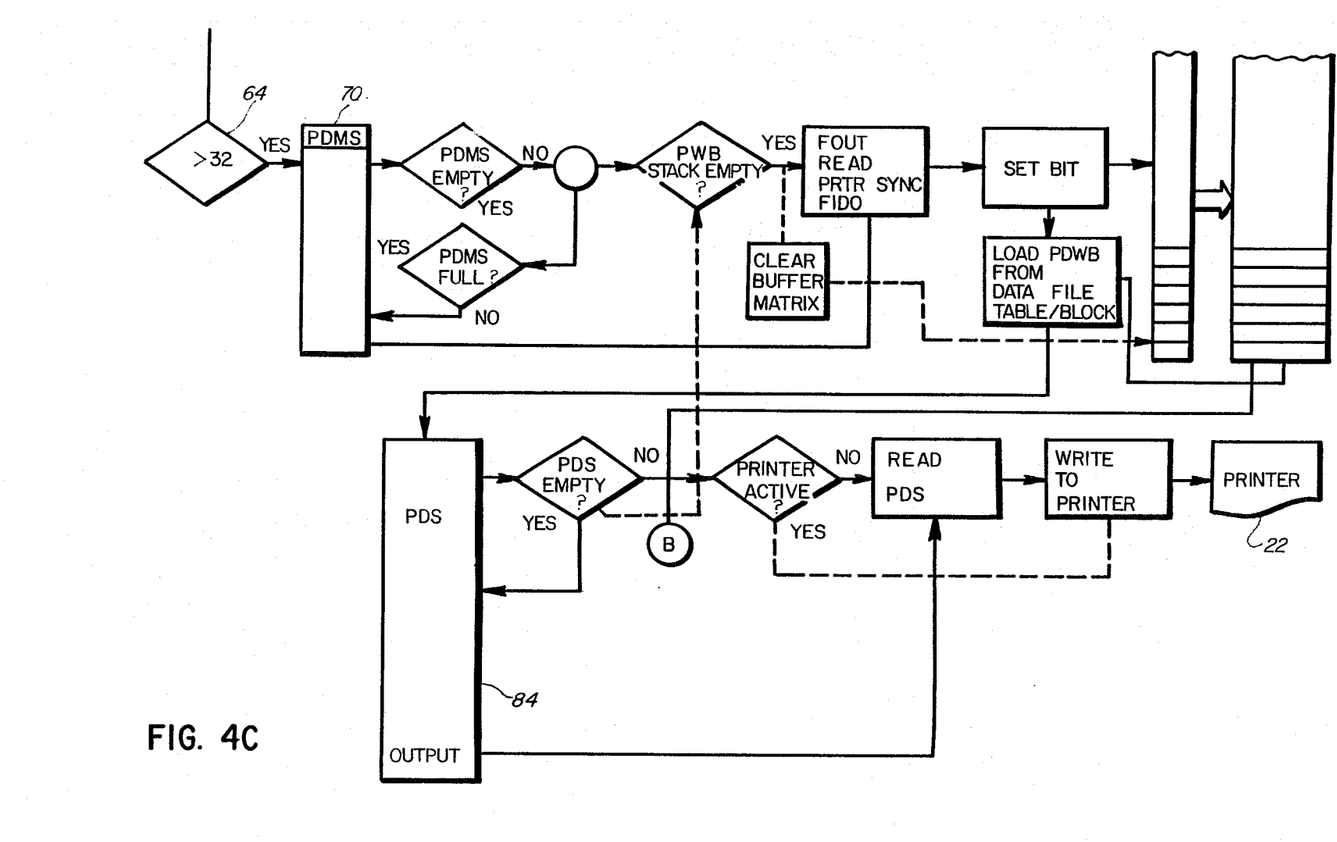

Finally, if the message number is greater than 32, indicating that the message was initiated by a coil within third subgroup 46 and, therefore, a message to be displayed by printer 22, fourth comparator (FIG. 4-C) 64 places the message number in a printer display message stack, or PDMS 70.

Referring again to FIG. 4B, PVDMS 66 receives priority video display message numbers from second comparator 60 and stores the message numbers in a first in, first out, or FIFO, manner.

Similarly, NVDMS 68 and PDMS 70 receive nonpriority video display and printer display messages, respectively, said messages also stored in a FIFO manner.

A video display stack, or VDS, 72, (FIG. 4D) further discussed below, stores the specific text of a single message immediately prior to the display of the message by VDT 20.

A third detector 73 coupled to VDS 72 determines whether VDS 72 is empty and therefore capable of receiving additional video display information.

Referring to FIG. 4B, a fifth decision block 74, coupled to third detector 73, allows the oldest message number stored in PVDMS 66 to be written into a first read block 75.

A fifth register 76 comprises 48 binary locations and is coupled to first read block 75.

The first sixteen binary locations of fifth register 76 correspond respectively to the sixteen priority video display message numbers.

Similarly, the second and third sixteen binary locations of fifth register 76 correspond respectively to the sixteen non-priority video display message numbers and the sixteen printer display message numbers.

When VDS 72 is determined to be empty by fifth decision block 74, the oldest message number residing in PVDMS 66 is released and the corresponding binary location within fifth register 76 changes state from zero to one.

A data file table 78 comprises forty-eight coils, wherein each coil controls the release therefrom of sixteen files. The first thirty-two coils of data file table 78 correspond to messages to be displayed by VDT 20, while the remaining sixteen coils thereof correspond to messages to be displayed by printer 22.

The first fifteen of the sixteen files corresponding to each of the forty-eight coils of data file table 78 can contain a programmed alphanumeric message. The sixteenth file thereof indicates how many of the fifteen files actually contain a message.

Actuation of a binary location within fifth register 76 actuates the corresponding coil within data file table 78, causing the release therefrom of the sixteen corresponding files, which are loaded into VDS 72 (FIG. 4-D).

VDS 72 stacks the messages files. Upon determination by a sixth decision block 80 that VDT 20 is currently not writing a message, the files presently stored in VDS 72 are read and displayed by VDT 20.

Referring to FIG. 4-B, message numbers stored in NVDMS 68 cause the display of the corresponding messages on VDT 20 in a similar manner as do message numbers stored in PVDMS 66. However, a seventh decision block 82 delays the reading of data contained within NVDMS 68 until PVDMS 66 is empty. Seventh decision block 82 insures that all priority messages to be displayed by VDT 20 are displayed prior to the display of any non-priority message.

Message numbers stored in PDMS 70 similarly cause messages to be generated; however, the messages are directed to a printer display stack, or PDS, 84 rather than VDS 72.

Referring again to FIG. 4A, first subgroup 42 includes eight coil addresses $C_A$-$C_H$, corresponding to the eight coils of second table 38 (FIG. 2). Thus, whenever pushbuttons $PB_1$=$PB_8$ become coupled to a different coil group $G_A$-$G_H$, indicating different functions for pushbuttons $PB_1$-$PB_8$, a priority message is generated by VDT 20 indicating the new functions thereof.

In order that the generation of an alarm message will couple pushbutton group 25 to the appropriate coil group $G_A$-$G_H$ allowing for a proper operator response, the forth-eight coils of data file table 78 can also be coupled so as to actuate one of coils $C_A$-$C_H$ of ninth coil group 40 (FIG. 2).

The coils $C_A$-$C_H$ control to which coil groups $G_A$-$G_H$ pushbutton group 25 is coupled. Therefore, the actuation of one of the forty-eight coils of data file table 78 provides alternate means for selectively coupling pushbutton group 25 to one of the coil groups $G_A$-$G_H$.

It is to be understood that the quantity of pushbuttons, the quantity of coil groups, the quantity and type of messages and manner of display herein disclosed are for example only and in no way limit the scope of the present invention.

I claim:

1. An operator interface for a programmable controller, the programmable controller having a plurality of discrete input terminals, a discrete input switch coupled to one of the input terminals, a plurality of discrete output terminals, a processor and a memory, the memory for storing operating system software processed by the processor and comprising relay logic, the processor for controlling states of the output terminals in response to states of the input terminals and the relay logic, the operator interface for selectively operatively coupling the input switch to a desired one of the output terminals, the operator interface comprising:

an operator actuable control switch coupled to another one of the input terminals; and means responsive to actuation of the control switch for selectively coupling the input switch to the selected one of the output terminals, the coupling means comprising the operating system software processed by the processor.

2. The operator interface of claim 1 including:

a video display terminal coupled to the programmable controller; and means for causing a visual representation of the selected one of the output terminals to be displayed by the video display terminal.

3. An operator interface for a programmable controller, the programmable controller having a plurality of discrete input terminals, a discrete input switch coupled to one of the input terminals, a plurality of discrete output terminals, a processor and a memory, the memory for storing operating system software processed by the processor and comprising software relays and software coils for controlling states of the output terminals in response to states of the input terminals, relays and coils, the operator interface for permitting the input switch to alter a state of a selected one of the software coils, the operator interface comprising:

an operator actuable control switch coupled to one of the input terminals; and means responsive to actuation of the control switch for selectively coupling the input switch to the selected one of the software coils, the coupling means comprising the operating system software processed by the processor.

4. The operator interface of claim 3 including:

a video display terminal coupled to the programmable controller; and means for causing a visual representation of the selected one of the coils to be displayed by the video display terminal.

* * * * *